United States Patent [19]
Paterson

[11] Patent Number: 4,551,723
[45] Date of Patent: Nov. 5, 1985

[54] EXCESSIVE DESCENT RATE WARNING SYSTEM FOR ROTARY WING AIRCRAFT

[75] Inventor: Noel S. Paterson, Bothell, Wash.

[73] Assignee: Sundstrand Data Control, Inc., Redmond, Wash.

[21] Appl. No.: 503,218

[22] Filed: Jun. 10, 1983

[51] Int. Cl.[4] .............................................. G08B 21/00
[52] U.S. Cl. .................................... 340/946; 340/963; 340/970; 73/178 H; 244/17.11; 364/433
[58] Field of Search .......... 340/27 AT, 27 R, 27 NA, 340/27 SS, 946, 963, 965, 970; 73/178 R, 178 T, 178 H; 244/17.11, 180, 182, 181, 183; 343/7 TA; 364/427, 428, 433

[56] References Cited

U.S. PATENT DOCUMENTS

| | | | |
|---|---|---|---|
| 3,946,358 | 3/1976 | Bateman | 340/27 R |
| 3,947,808 | 3/1976 | Bateman | 340/27 AT |
| 3,958,218 | 5/1976 | Bateman | 340/27 R |
| 4,060,793 | 11/1977 | Bateman | 244/180 |
| 4,215,334 | 7/1980 | Bateman | 364/433 |
| 4,293,840 | 10/1981 | Hadari | 364/433 |

*Primary Examiner*—John W. Caldwell, Sr.
*Assistant Examiner*—Michael F. Heim
*Attorney, Agent, or Firm*—Mason, Kolehmainen, Rathburn & Wyss

[57] ABSTRACT

A warning system for providing an aural warning to the pilot of a rotary wing aircraft monitors the altitude above ground and barometric descent rate of the aircraft and generates the warning if the descent rate of the aircraft is excessive for the altitude at which the aircraft is flying. The system provides two distinct warnings, one being an early warning advising the pilot of a hazardous condition, and the other being a warning alerting the pilot of imminent danger. The system also includes tactical and non-tactical modes of operation, wherein the warning criteria are adjusted to meet tactical and non-tactical flight conditions.

18 Claims, 3 Drawing Figures

EXCESSIVE DESCENT RATE WARNING SYSTEM FOR ROTARY WING AIRCRAFT

BACKGROUND OF THE INVENTION

1. Field of the Invention

This invention relates generally to ground proximity warning systems, and more particularly to a system that provides a warning to the pilot of a rotary wing aircraft, such as a helicopter, if the descent rate of the aircraft is excessive for the altitude at which the aircraft is flying. Such a warning is particularly useful during approach and landing phases of aircraft operation.

2. Description of the Prior Art

Systems for providing the pilot of an aircraft with a warning in the event that the aircraft is descending too rapidly, particularly on approach to a landing, are known. Examples of such systems are disclosed in U.S. Pat. Nos. 3,946,358; 3,947,808; 3,958,219 and 4,215,334, all assigned to the same assignee as the assignee of the present invention.

While all of the above systems serve the basic function of alerting the pilot if the descent rate of the aircraft exceeds a predetermined safe rate determined by the altitude above ground of the aircraft, the above described systems are designed to operate with transport aircraft, particularly with large, turbine-powered aircraft of the type flown by commercial airlines. However, since rotary wing aircraft are substantially more maneuverable than transport aircraft, systems designed for transport aircraft tend to provide false or nuisance warnings when no unsafe condition exists. Consequently, pilots tend to ignore the warnings provided by such systems, and the system becomes ineffective.

One system designed specifically for helicopters is described in U.S. Pat. No. 4,293,840. This system monitors the descent rate of the aircraft, as determined by the radio altitude rate, and generates a warning if the descent rate is excessive for the altitude at which the aircraft is flying. However, even though this system is much more suitable for use in rotary wing aircraft than is a system designed for transport aircraft, the system described in the '840 reference is a relatively complex system that adjusts the altitude at which the warning is generated as a function of the forward speed of the aircraft. Also, the system disclosed in the '840 reference appears to be designed for use in non-tactical aircraft operation, and consequently it will have a tendency to generate false warnings when used in an aircraft engaged in tactical maneuvers.

SUMMARY OF THE INVENTION

Accordingly, it is an object of the present invention to provide a ground proximity warning system that overcomes many of the disadvantages of the prior art warning systems.

It is another object of the present invention to provide a warning to the pilot of a rotary wing aircraft if the descent rate of the aircraft is excessive for the altitude above ground signal at which the aircraft is flying.

It is yet another object of the present invention to provide a ground proximity warning system for alerting the pilot of a rotary wing aircraft if its descent rate is dangerously high, with the warning criteria having been selected to match the operating procedures used with such rotary wing aircraft.

It is another object of the present invention to provide a warning system for use in rotary wing aircraft that generates a warning if the descent rate of the aircraft is excessively high for the altitude at which the aircraft is flying, but which does not generate an appreciable number of false or nuisance warnings when used in a highly maneuverable aircraft.

It is another object of the present invention to provide a warning system for rotary wing aircraft that generates a first warning advising the pilot of an excessive descent rate if the descent rate exceeds a first predetermined value that is a function of the altitude of the aircraft above the ground, and that generates a second different warning in the event that the maximum permissible descent rate is substantially exceeded.

It is yet another object of the present invention to provide a ground proximity warning system particularly usable in rotary wing aircraft such as tactical helicopters wherein the criteria used to determined whether a warning should be generated are adjusted depending on whether the aircraft is flying a tactical or non-tactical segment of a mission.

Briefly, in accordance with a preferred embodiment of the invention, there is provided a system that monitors the altitude above ground and the descent rate of a rotary wing aircraft, and issues a first aural warning if the descent rate exceeds a predetermined safe limit for the radio altitude at which the aircraft is flying. If the descent rate exceeds the predetermined safe limit by a predetermined margin, a second distinct aural warning is generated to warn the pilot of a particularly dangerous flight condition. The criteria for generating the warnings are altered if the aircraft is flying a tactical segment of a mission to optimize the warning criteria for the maneuvers normally encountered during the tactical segments of a mission to minimize nuisance warnings, while providing a warning sufficient to permit the pilot to land the aircraft by autorotation.

DESCRIPTION OF THE DRAWING

These and other objects and advantages of the present invention will become readily apparent upon consideration of the following detailed description and attached drawing wherein.

DETAILED DESCRIPTION OF THE PREFERRED EMBODIMENT

Figure 1:
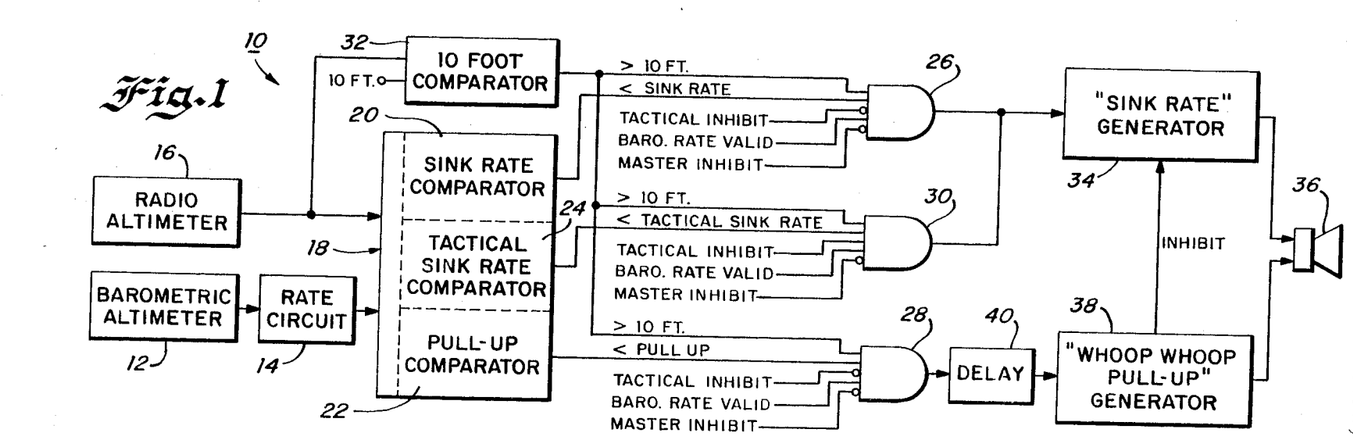
FIG. 1 is a logical block diagram of the warning system according to the invention.

Referring now to the drawing with particular attention to FIG. 1, there is illustrated an embodiment of the ground proximity warning system for rotary wing aircraft according to the invention generally designated by the reference numeral 10. The system 10 according to the invention is illustrated in FIG. 1 in logical block diagram form as a series of gates, comparators and the like for purposes of illustration; however, it should be understood that the actual implementation of the logic can be other than as shown in FIG. 1, with various digital and analog implementations being possible. The signals used by the system as described include radio altitude and barometric altitude rate, a signal indicative of a tactical mission, such as a signal obtained from a tactical mission switch, along with various validity signals. Depending on the type of aircraft in which the warning system is installed, the signals shown in FIG. 1 can be obtained from individual instruments, such as a barometric altimeter 12, a barometric rate circuit 14, a radio altimeter 16 and a discrete element such as a tactical mission switch that indicates whether the aircraft is in a tactical or non-tactical mode of operation. Alternatively, the signals can be obtained from a digital data bus in certain newer aircraft.

As previously stated, the system according to the invention compares the altitude above ground of the aircraft with the descent rate, preferably barometric descent rate, although radio altitude rate can be used, and issues a warning if the descent rate is excessive for the altitude at which the aircraft is flying. The comparison function is provided by a mode comparator 18, which in the present embodiment, compares the radio altitude signal from the altimeter 16 with the barometric altitude rate signal from the rate circuit 14 under three different criteria. In the illustrated embodiment, the three different criteria are defined by three sections of the comparator 18. These sections include a sink rate comparator 20, a pull-up comparator 22 and a tactical sink rate comparator 24, all shown as being part of the comparator 18 for purposes of illustration; however, three separate comparators could also be used. In addition, the names given to the comparators 20, 22 and 24 have been chosen for purposes of illustration to indicate the type of voice warning initiated by the various comparators, and to associate the various comparators with the particular warning criteria illustrated in FIGS. 2 and 3; however, other designations could be applied to the three comparators.

The output of each of the comparators 20, 22 and 24 is applied to an input of one of three AND gates 26, 28 and 30, respectively. The AND gates 26, 28 and 30 are enabled under various conditions, with the AND gates 26 and 28 being inhibited during tactical operation by a tactical inhibit signal, which may be obtained, for example, from a discrete circuit such as a tactical mission switch or a weapons arming switch. Conversely, the AND gate 30 is enabled by the TACTICAL INHIBIT signal during tactical phases of operation, and consequently, the AND gates 26 and 28 control the generation of a warning during non-tactical phases of flight, and the AND gate 30 controls the generation of the warning during tactical maneuvers.

In addition, all three of the AND gates 26, 28 and 30 are inhibited by a signal from a 10 foot comparator 32 that compares the radio altitude signal from the radio altimeter 16 with a reference signal representative of 10 feet of altitude above ground, and serves to inhibit the AND gates 26, 28 and 30 when the aircraft is below 10 feet above ground to minimize nuisance warnings. In addition, all three gates are inhibited by a BARO RATE VALID signal in the event of a defective barometric altimeter or a barometric rate circuit and a MASTER INHIBIT signal inhibits the AND gates 26, 28 and 30 in the event of a faulty radio altimeter or other instrument.

Assuming that the aircraft is flying above 10 feet above the ground, and that none of the AND gates 26, 28 and 30 is inhibited by any of the other inputs thereto, the AND gates 26, 28 and 30 are controlled by the comparators 20, 22 and 24 respectively, so that if any of the three warning criteria is violated the appropriate warning will be generated.

For example, if the aircraft is operating in a non-tactical mode of operation, the gates 26 and 28 will be enabled and the gate 30 will be inhibited. Under these conditions, if the combination of descent rate and altitude above ground is such that the warning criteria established by the sink rate comparator 20 are exceeded, the sink rate comparator 20 will apply an enabling signal to the AND gate 26, thereby causing the AND gate 26 to apply a warning initiation signal to a SINK RATE generator 34. The SINK RATE generator 34 is preferably a digital voice generator that is responsive to the warning initiation signal from the AND gate 26 and generates a specific voice warning that is applied to a transducer, such as an earphone or a loudspeaker 36, either directly or indirectly, for example, through the intercom system of the aircraft. The warning should be a specific warning to advise the pilot of the specific condition causing the warning to be generated, and it has been found that the words "SINK RATE" are particularly useful for communicating the problem to the pilot.

In the event that the relationships between the descent rate and the altitude of the aircraft above ground is such that the warning criteria established by the pull-up comparator 22 are exceeded, the pull-up comparator 22 applies an enabling signal to the AND gate 28. Typically, exceeding the warning criteria established by the pull-up comparator 22 is indicative of a more dangerous flight condition than exceeding the criteria established by the sink rate comparator 20. Consequently, a more urgent warning is provided under these conditions. In the illustrated embodiment, the more urgent warning is generated by a WHOOP-WHOOP PULL-UP generator 38, which is preferably a digital voice generator also. The generator 38 may either be separate from the generator 34, or preferably, incorporated in the same unit.

The generator 38 is controlled by the AND gate 28 which applies a signal to the generator 38 via a delay 40. Consequently, the warning generated by the generator 38 is generated a short time after the warning criteria defined by the comparator 22 have been exceeded. Preferably, the delay time provided by the delay 40 is on the order of approximately 1.5 seconds, a value which has been selected to minimize nuisance warnings without excessively shortening the warning time. The warning priorities are selected such that the generation of a warning by the generator 38 inhibits further warnings by the generator 34.

When the aircraft is in a tactical phase of operation, the gates 26 and 28 are disabled, and the AND gate 38 is enabled by the tactical inhibit signal. This places the AND gate 30 under the control of the tactical sink rate comparator 24 which provides a signal to the gate 30 when the criteria established by the comparator 24 have been exceeded. This causes the gate 30 to generate a warning initiation signal and apply it to the SINK RATE generator 34 in order to cause the "SINK RATE" warning to be generated. The "SINK RATE" warning has been selected instead of the "WHOOP-WHOOP PULL-UP" warning because it provides a more specific indication of the condition causing the warning to be generated, and is less likely to fluster a pilot during tactical operation.

Figure 2:
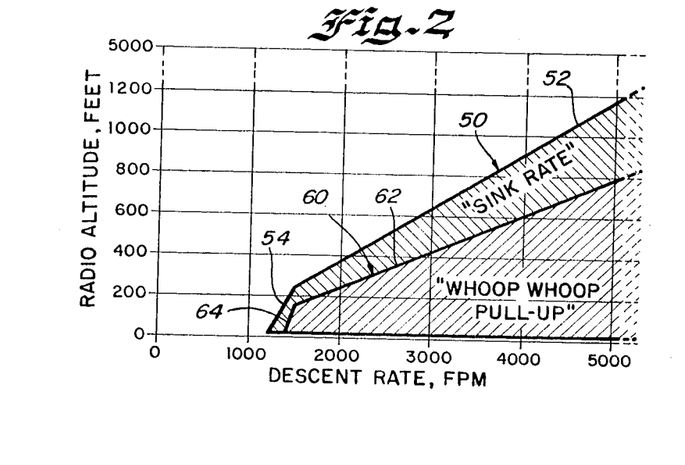
FIG. 2 is a graph of the descent rate required to generate two distinct warnings as a function of radio altitude when the system is operating in a non-tactical mode of operation.

The specific relationships between altitude above ground and descent rate required to generate warnings in the non-tactical mode of operation are illustrated in FIG. 2. The graph of FIG. 2 illustrates a warning envelope having two warning boundaries. The first warning boundary 50 includes two linear segments 52 and 54, and an inner warning boundary 60 having a pair of linear segments 62 and 64. The outer boundary 50 can be termed the advisory boundary because the term "SINK RATE" that is generated when the boundary 50 is penetrated advises the pilot of a specific hazardous condition that exists. The boundary 60 may be termed a warning boundary because penetration of the boundary 60 is indicative of a more dangerous flight condition than penetration of the boundary 50. Consequently, a more urgent warning, such as, for example, the "WHOOP-WHOOP PULL-UP" warning is generated when the warning boundary 60 is penetrated.

The shapes of the boundaries 50 and 60 have been selected to provide adequate warning to the pilot without causing appreciable nuisance warnings. It has been found through much analysis and experimentation, that it is desirable to use a two-step warning curve having two different slopes. This results in a relatively sensitive warning system that provides the pilot with adequate warning time at normal flight altitudes without causing nuisance warnings during low level maneuvers, such as those performed during normal approaches to a landing, and during towing operations. It has been found that a suitable equation for defining the segment 52 above a descent rate of 1,500 feet per minute:

$$H\ WARN = -180\ feet + 0.2733 \times H_b$$

wherein H WARN is the altitude at which the warning is generated in feet, and $H_b$ is the descent rate in feet per minute.

Below a descent rate of 1500 feet per minute, the segment 54 is defined by the equation:

$$H\ WARN = -920\ feet + 0.7666 \times H_b$$

The equation for the segment 62 is:

$$H\ WARN = -110\ feet + 0.18 \times H_b$$

and the equation for the segment 64 is:

$$H\ WARN = -2240\ feet + 1.6 \times H_b$$

The segment 52 intersects the segment 54 at approximately 230 feet of radio altitude, and the segment 62 intersects the segment 64 at approximately 160 feet of radio altitude.

All warnings are inhibited below 10 feet of radio altitude to minimize nuisance warnings. The warning curves extend to the range limits of the radio altimeter, typically 5,000 feet.

Figure 3:
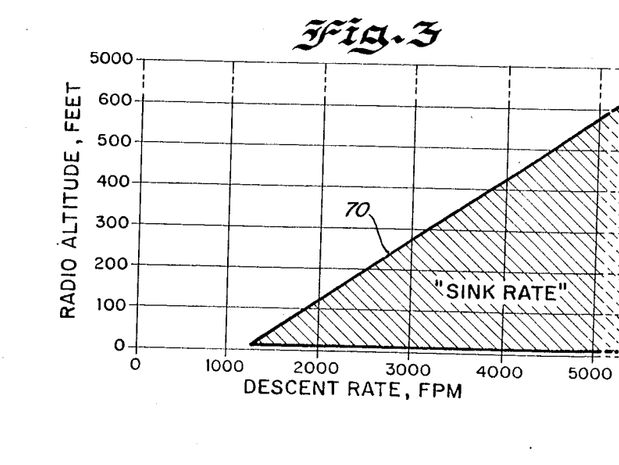
FIG. 3 is a graph of the descent rate required to generate a warning as a function of radio altitude when the system is operating in a tactical mode of operation.

A graph of the warning envelope necessary to generate a warning during a tactical mode of operation is illustrated in FIG. 3. The warning boundary shown in FIG. 3 is based on allowing the aircraft to reach the maximum sink rate possible from which it can recover by autorotation in the event of a failure in the aircraft engine or rotor systems.

It is a characteristic of rotary wing aircraft such as helicopters, that in the event of a failure of one or more of the components driving the main rotor, the aircraft can be brought safely to the ground by a process called autorotation which is analogous to a glide in a fixed wing aircraft. In the autorotation mode, the pitch of the main rotor is adjusted as the aircraft sinks in order to cause the main rotor to rotate rapidly, thereby to build up kinetic energy in the main rotor. This kinetic energy is later used to slow the descent of the aircraft as it approaches the ground. Typically, during the energy storing phase of autorotation, the blades of the helicopter are initially maintained at a relatively low pitch angle to cause the rotor to speed up while the aircraft is still at a relatively high altitude. As the aircraft approaches the ground, the stored energy is retrieved by increasing the pitch of the rotor blades to thereby generate lift in order to slow the descent of the aircraft prior to touchdown.

Unfortunately, the autorotation mode is hazardous because relatively high descent rates can be achieved during the energy storage phase, and because the amount of kinetic energy that can be stored in the rotor is limited. Consequently, it is possible for the pilot to achieve a descent rate that is so high that it cannot be sufficiently reduced by the limited energy stored in the rotor to permit a safe landing.

The curve illustrated in FIG. 3 defines the maximum descent rate from which a safe landing can be made by autorotation as a function of altitude, and thus serves two purposes. Firstly, it serves as an aid during tactical maneuvers so that the pilot will maintain the relationship between sink rate and altitude above ground such that the aircraft can land safely by autorotation in the event that the aircraft is damaged by enemy fire, or by the stresses encountered during tactical maneuvers. Secondly, the warning system serves as an aid to the pilot once autorotation has been initiated by generating a warning whenever the sink rate becomes excessive. The curve of FIG. 3 has been optimized for the Sikorski CH53 series of helicopters, but it should be usable with other similar helicopters; however, some modification may be required if it is to be used with helicopters that have substantially different flight and operational characteristics.

In the graph shown in FIG. 3, a warning is generated whenever the aircraft is above 10 feet above the ground and the warning boundary defined by a line 70 is penetrated. As previously discussed, the warning boundary 70 defines the maximum descent rate from which the aircraft can recover by autorotation as a function of altitude above the ground. The equation for the boundary 70 is:

$$H\ WARN = -184.6\ feet + 0.1545 \times H_b$$

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for rotary wing aircraft of the type capable of autorotation, comprising:
   means for receiving signals representative of the altitude of the aircraft above the ground and the descent rate of the aircraft; and
   means responsive to said receiving means for generating a warning if the relationship between the altitude and descent rate of the aircraft approaches the point where the aircraft cannot be landed safely by autorotation.

2. A warning system as recited in claim 1 further including means for providing a signal representative of the altitude above ground of the aircraft and means for providing a signal representative of the descent rate of the aircraft coupled to said receiving means.

3. A warning system as recited in claim 2 wherein said altitude above ground signal providing means includes a radio altimeter.

4. A warning system as recited in claim 1 wherein said warning generating means includes means responsive to the altitude and descent rate signal for providing a warning if the descent rate exceeds a descent rate of approximately 1,250 feet per minute at an altitude of approximately 10 feet above ground, and generates a warning when the descent rate is approximately 3,500 feet per minute at an altitude of approximately 350 feet above the ground.

5. A warning system as recited in claim 4 wherein the descent rate required to generate a warning increases linearly between 10 feet of altitude above the ground and 350 feet of altitude above the ground.

6. A warning system as recited in claim 5 wherein the descent rate required to generate a warning increases linearly above 350 feet above the ground.

7. A warning system as recited in claim 1 wherein the altitude above the ground required to generate a warning as a function of descent rate is given by the equation:

$$H\ WARN = -184.6\ ft + 0.154\ H_b$$

wherein H WARN is the warning altitude in feet, $H_b$ is the descent rate in feet per minute, and wherein the warning is generated when the aircraft drops below the warning altitude H WARN.

8. A warning system as recited in claim 7 wherein H WARN is a radio altitude, and wherein $H_b$ is a barometric descent rate.

9. A warning system for warning the pilot of a tactical rotary wing aircraft of an unsafe flight condition during both tactical and non-tactical phases of flight, comprising:
 means responsive to signals representative of the altitude of the aircraft above ground and the descent rate of the aircraft for generating a warning if the descent rate of the aircraft exceeds a predetermined rate for the altitude at which the aircraft is flying as determined by a first criterion when said aircraft is flying in a non-tactical phase of flight; and
 means responsive to the phase of flight of the aircraft for changing said first criterion to a different second criterion when said aircraft is in a tactical phase of flight.

10. A warning system as recited in claim 9 wherein said second criterion defines the relationship between the altitude above ground and descent rate of the aircraft required for the aircraft to be landed safely by autorotation.

11. A warning system as recited in claim 9 wherein said means for generating a warning as determined by the first criterion includes means for generating two distinct voice warnings.

12. A warning system for warning the pilot of a rotary wing aircraft of an unsafe flight condition, comprising:
 means for receiving signals representative of the altitude of the aircraft above ground and the descent rate of the aircraft; and
 means responsive to said receiving means for generating a warning if the aircraft is flying above a predetermined altitude above ground and has a descent rate of less than approximately 1,500 feet per minute, and the altitude above ground drops below a warning altitude defined by the following equation:

$$H\ WARN = -920\ ft + 0.7666\ H_b$$

wherein H WARN is the altitude at which the warning is generated in feet and $H_b$ is the descent rate in feet per minute, said system further including means for generating a warning for descent rates above 1,500 feet per minute, wherein the warning is generated when the aircraft drops below the warning altitude H WARN defined by the following equation:

$$H\ WARN = -180\ ft + 0.2733 \times H_b.$$

13. A warning system as recited in claim 12 further including means for generating a second distinct warning below a descent rate of 1,500 feet per minute when the altitude drops below the warning altitude, H WARN, defined by the following equation:

$$H\ WARN = -2240\ ft + 1.6 \times H_b$$

said system further including means for generating a warning for descent rates in excess of 1,500 feet per minute when the altitude drops below the warning altitude H WARN given by the following equation:

$$H\ WARN = -110\ ft + 0.18 \times H_b.$$

14. A warning system as recited in claim 13 wherein H WARN is a radio altitude and $H_b$ is a barometric descent rate.

15. A warning system as recited in claim 14 wherein said warning means includes means for generating first and second voice warnings, said first voice warning corresponding to said first warning and said second voice warning corresponding to said second distinct warning.

16. A warning system as recited in claim 12 wherein said system includes means for generating said warning at altitudes of up to approximately 5000 feet above the ground.

17. A warning system as recited in claim 12 wherein said system includes means for generating said warning at altitudes in the range of altitudes between approximately 10 feet above the ground to approximately 5000 feet above the ground.

18. A warning system for warning the pilot of a rotary wing aircraft of an unsafe flight condition, comprising:
 means for receiving signals representative of the altitude of the aircraft above ground and the descent rate of the aircraft; and
 means responsive to said receiving means for generating a warning if the aircraft is flying above a predetermined altitude above ground and has a descent rate of less than approximately 1,500 feet per minute, and the altitude above ground drops below a warning altitude defined by the following equation:

$$H\ WARN = -920\ ft + 0.7666\ H_b$$

wherein H WARN is the altitude at which the warning is generated in feet and $H_b$ is the descent rate in feet per minute, said system further including means for generating a warning for descent rates above 1,500 feet per minute, wherein the warning is generated when the aircraft drops below the warning altitude H WARN defined by the following equation:

$$H\ WARN = -180\ ft + 0.2733 \times H_b$$

and further including means for altering the warning altitudes such that a warning is generated whenever the relationship between the altitude and descent rate of the aircraft approaches the point where the aircraft cannot be landed safely by autorotation.

* * * * *

UNITED STATES PATENT AND TRADEMARK OFFICE
CERTIFICATE OF CORRECTION

PATENT NO. : 4,551,723

DATED : November 5, 1985

INVENTOR(S) : NOEL S. PATERSON

It is certified that error appears in the above-identified patent and that said Letters Patent is hereby corrected as shown below:

Column 1, line 12, after "warning" insert --system--.

Column 1, line 60, delete "signal".

Column 2, line 17, delete "determined" and substitute therefor --determine--.

Column 4, lines 12 and 13, delete "preferrably" and substitute therefor --preferably--.

Column 5, in the equation appearing at line 30, delete "$H_b$" and substitute therefor --$\dot{H}_b$--.

Column 5, line 34, delete "$H_b$" and substitute therefor --$\dot{H}_b$--.

Column 5, in the equation appearing at line 38, delete "$H_b$" and substitute therefor --$\dot{H}_b$--.

UNITED STATES PATENT AND TRADEMARK OFFICE
CERTIFICATE OF CORRECTION

PATENT NO. : 4,551,723

DATED : November 5, 1985

INVENTOR(S) : NOEL S. PATERSON

Page 2 of 4

It is certified that error appears in the above-identified patent and that said Letters Patent is hereby corrected as shown below:

Column 5, in the equation appearing at line 42, delete "$H_b$" and substitute therefor --$\dot{H}_b$--.

Column 6, in the equation appearing at line 50, delete "$H_b$" and substitute therefor --$\dot{H}_b$--.

Column 7, claim 7, in the equation appearing at line 31, delete "$H_b$" and substitute therefor --$\dot{H}_b$--.

Column 7, claim 7, line 33, delete "$H_b$" and substitute therefor --$\dot{H}_b$--.

Column 7, claim 8, line 38, delete "$H_b$" and substitute therefor --$\dot{H}_b$--.

Column 8, claim 12, in the equation appearing at line 11, delete "$H_b$" and substitute therefor --$\dot{H}_b$--.

UNITED STATES PATENT AND TRADEMARK OFFICE
CERTIFICATE OF CORRECTION

PATENT NO. : 4,551,723

DATED : November 5, 1985

INVENTOR(S) : NOEL S. PATERSON

It is certified that error appears in the above-identified patent and that said Letters Patent is hereby corrected as shown below:

Column 8, claim 12, line 14, delete "$\overset{.}{H}_b$" and substitute therefor --$\overset{.}{H}_b$--.

Coulmn 8, claim 12, in the equation appearing at line 21, delete "$\overset{.}{H}_b$" and substitute therefor --$\overset{.}{H}_b$--.

Column 8, claim 13, in the equation appearing at line 35, delete "$\overset{.}{H}_b$" and substitute therefor --$\overset{.}{H}_b$--.

Column 8, claim 14, line 39, delete "$\overset{.}{H}_b$" and substitute therefor --$\overset{.}{H}_b$--.

Column 9, claim 18, in the equation appearing at line 1, delete "$\overset{.}{H}_b$" and substitute therefor --$\overset{.}{H}_b$--.

UNITED STATES PATENT AND TRADEMARK OFFICE
CERTIFICATE OF CORRECTION

PATENT NO. :  4,551,723

DATED     :  November 5, 1985

INVENTOR(S) :  NOEL S. PATERSON

It is certified that error appears in the above-identified patent and that said Letters Patent is hereby corrected as shown below:

Column 9, claim 18, line 4, delete "$H_b$" and substitute therefor --$\dot{H}_b$--.

Column 10, claim 18, in the equation appearing at line 1, delete "$H_b$" and substitute therefor --$\dot{H}_b$--.

Signed and Sealed this

Fifteenth Day of March, 1988

Attest:

DONALD J. QUIGG

*Attesting Officer*      *Commissioner of Patents and Trademarks*